Figure 1:
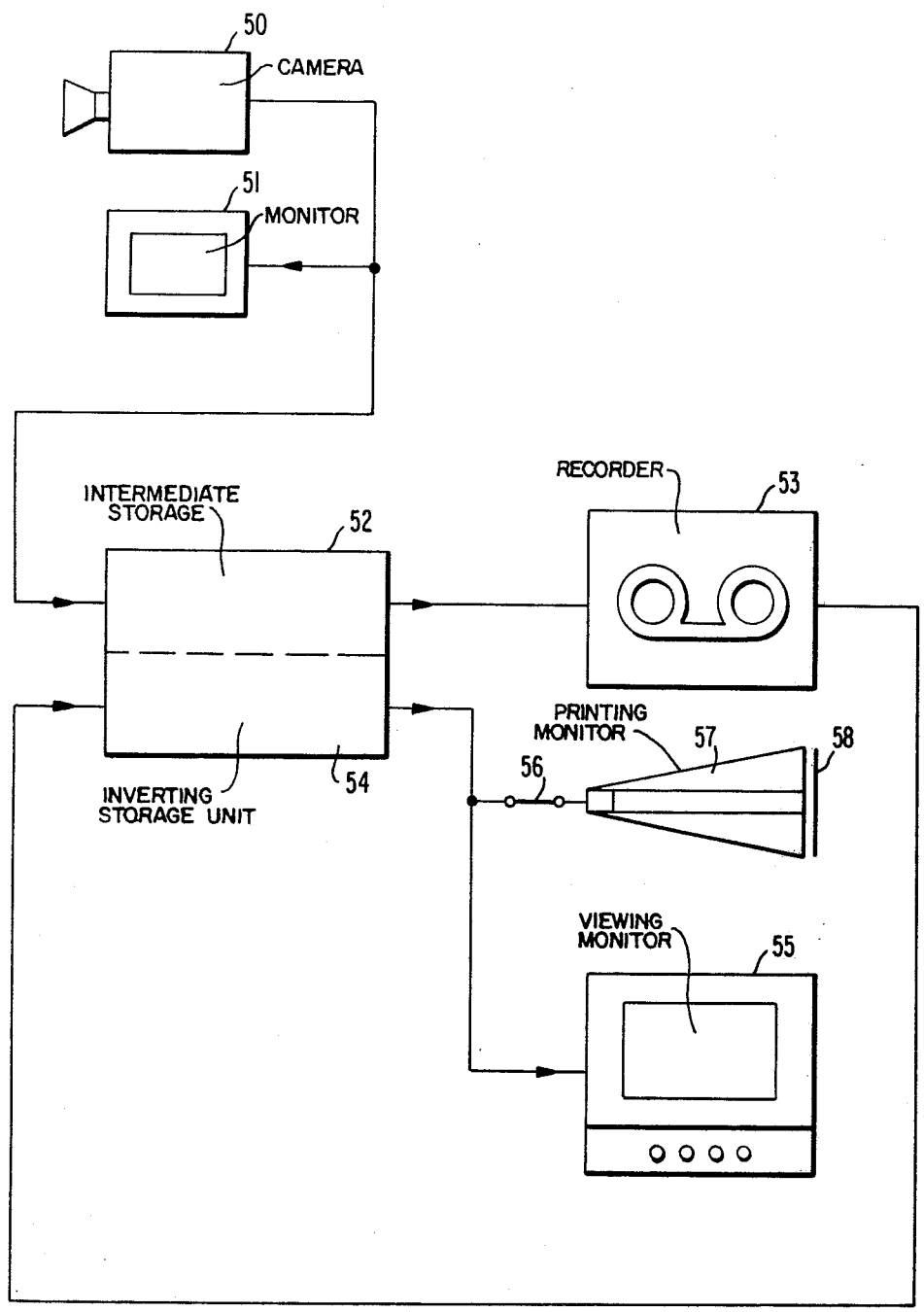

United States Patent [19]

Mender et al.

[11] 4,130,834
[45] Dec. 19, 1978

[54] METHOD OF AND APPARATUS FOR THE PRODUCTION OF PHOTOGRAPHIC STILLS

[75] Inventors: Adolf Mender, Ottobrunn; Horst Schmidt, Bad Honeff, both of Germany

[73] Assignee: Videoprint Gesellschaft fur Industrie-Fernsehen mbH, Ottobrunn, Germany

[21] Appl. No.: 535,150

[22] Filed: Dec. 20, 1974

[51] Int. Cl.² .................... H04N 9/02; H04N 7/18
[52] U.S. Cl. .................... 358/127; 358/130; 358/134; 358/256; 358/302
[58] Field of Search ............. 178/6.8, 6.6 R, 6.7, 178/7.4; 358/127, 130, 302, 256, 134

[56] References Cited

U.S. PATENT DOCUMENTS

| 2,711,441 | 6/1955 | Hammond | 358/181 |
|---|---|---|---|
| 3,061,670 | 10/1962 | Oster et al. | 178/6.8 |
| 3,184,753 | 5/1965 | Koster | 178/7.4 |
| 3,392,385 | 7/1968 | Martin | 343/5 |
| 3,493,677 | 2/1970 | Paine | 178/6.6 |
| 3,741,118 | 6/1973 | Carley | 178/6.8 |
| 3,803,350 | 4/1974 | Lemelson | 358/903 |
| 3,943,558 | 3/1976 | Izura | 358/1 |
| 3,974,329 | 8/1976 | Zenzefilis | 358/134 |

OTHER PUBLICATIONS

Otto H. Schade, "RCA Publication," pp. 36–39, Press Release 10-11-67.

Primary Examiner—Robert L. Griffin
Assistant Examiner—Edward L. Coles
Attorney, Agent, or Firm—Burns, Doane, Swecker & Mathis

[57] ABSTRACT

A method for producing photographic stills comprises producing a video signal by electronic high resolution scanning of the object to be photographed, writing the video signal into intermediate storage and reading the signal out of intermediate storage to write a photographic still, the time for writing the video signal into intermediate storage being shorter than the time for writing the still. An apparatus for producing photographic stills includes a electronic camera tube and a permanent storage means into which the video signal provided by the camera is written more rapidly than it is read out. The apparatus may also include an inverting video signal storage unit and associated repetition generator.

16 Claims, 2 Drawing Figures

METHOD OF AND APPARATUS FOR THE PRODUCTION OF PHOTOGRAPHIC STILLS

The conventional method of producing photographic stills by photochemical processes has one drawback which particularly affects professional photographer and studio work, namely that there is a considerable time lag between the taking of a picture and the production of the finished print because time is needed for developing and printing the film. It is therefore impossible to judge the quality of a picture at once. When using expensive models this delay costs money because the models must wait until the finished prints are available and a decision can be made whether photographs should be repeated. Frequently it may be impossible to take a second photograph because the time of models is too limited. Although instant cameras are known which permit a print to be inspected within minutes of a photograph having been made, such pictures are of limited technical quality and more particularly they are hardly suitable for use as originals for the production of printing blocks. Another shortcoming of conventional methods is that all the photographs must be developed before a choice can be made which are the most suitable. Since in professional photography usually only a very few photographs are selected from a large number of pictures for ultimate use, this is another factor which uneconomically adds to cost.

It is therefore an object of the present invention to provide a method of producing photographic stills, which will permit the pictures to be available with in a very short time after they have been taken, so that their content and technical quality can be immediately judged, and which also provides pictures of a quality suitable for reproduction. The invention further concerns apparatus for performing the method.

According to the invention the contemplated object is achieved by converting the optical image of the photographed object by a high resolution electronic scan of at least 1000 lines per image into a video signal which is permanently stored and by using the stored video signal to write the photographed picture.

This novel method is a complete departure from the hitherto conventional photochemical process and enables photographic still pictures to be electrically produced in a surprisingly simple way and with a quality that need not be inferior to pictures produced by photochemical methods. For this purpose the novel method avails itself of techniques known to television, by specially adapting them to the production of stills. The optical image of the photographed object is electronically read by a line scan. However, owing to the high resolution obtained by the choice of a scan of at least 1000 lines and preferably 1500 lines per picture, the pictorial quality achieved is substantially better than that obtained in television. The permanent storage of the video signal obtained by the scan serves a twofold purpose. Firstly the video signal is thus made available for any desired length of time and permits as many reproductions of the photographed picture to be made as required. On the other hand, by further processing the permanently stored video signal at a lower speed the necessary width of the frequency band on the reproduction side of the system can be reduced, whereas in the interests of the desired high resolution on the camera side and the short exposures that are desired the signal band width must be very wide, considerably in excess of the usual standard band width of 5 Mc/s in television. On the reproduction side a much slower speed of readout of the picture is possible because only stills are reproduced and there is no need to adhere to a prescribed picture frame frequency. Reproduction by writing the picture with the aid of the permanently stored video signal can be performed in any known way.

The method according to the invention has the special advantage that the picture can be reproduced and judged for quality practically immediately after it has been taken. Unsatisfactory takes can be repeated without delay. Owing to its permanent storage each picture remains available for the reproduction at a later time or, should the picture be unsatisfactory or not wanted for other reasons, it can be immediately erased. This results in a considerable speeding up of the work, a matter of great importance to the professional photographer, and the consequent saving in production cost readily justifies the higher initial cost of the apparatus. Another advantage is the flexibility of the proposed method. Unsatisfactory photographs can be discarded at once without requiring previous development. The other photographs can be permanently stored and later processed in diverse ways even after the lapse of considerable periods of time. Moreover, on the reproduction side it is very easy to affect the picture electronically, for instance with regard to saturation, brightness or in order to reproduce only a selected part. Moreover, trick effects, such as negative inversion, the superimposition of writing and so forth, can be easily accomplished. In these latter respects the proposed method opens up possibilities which were not available in the conventional techniques, at least not at an acceptable cost. Finally and more particularly, since there is no chemical waste the proposed method eliminates the risk of environmental pollution which arises when photochemical processes must be performed.

In a preferred embodiment of the proposed method the video signal, prior to its permanent storage, is intermediately stored, the time used for writing the picture into the intermediate storage being shorter than the time used for reading it out. In this embodiment the above mentioned reduction of the width of the frequency band is already effected in the intermediate storage stage, so that the inherent advantages of intermediate storage benefit not only reproduction but also the following permanent storage. This is useful because permanent storage will mostly comprise a major number of pictures, whereas only one picture at a time need be passed through the intermediate storage stage. The speed of writing into intermediate storage depends upon the length of the exposure used for taking the pictures and the writing time will normally not exceed 40 msecs per picture. The time for reading out of intermediate storage will depend on the one hand upon the desired degree of band width compression and on the other hand upon the maximum frequency at which pictures are to be taken consecutively. The latter limitation arises because the video signal of a fresh picture cannot be intermediately stored until a read-out of the video signal of the preceding picture has been at least begun.

For writing the picture for the purpose of reproduction direct use can be made of the permanently stored video signal. However, if the written picture is to be viewed for some time without the employment of a further record carrier and if flicker is to be avoided, then the process of write-out will usually have to be repeated several times. The necessary repeated write-out of the permanently stored picture would be a complicated procedure. It is therefore preferred for writing the picture to transfer the video signal into an inverse storage unit and to read the picture in this storage unit several times per second, the repetition frequency depending upon the desired freedom from flicker.

In the simplest case the picture may be written on the fluorescent screen of a picture display tube. The pictures can thus be made visible, for instance for the purpose of selection and examination immediately they have been taken. On the other hand, if a permanent record of a picture is needed a display tube lacking a fluorescent screen can be used to print out on a photosensitive paper which can then be processed in the customary manner to provide a permanent print. Generally speaking print-outs will be performed only in the case of those pictures which have been selected for further use after prior inspection on the fluorescent screen of a normal display tube. An alternative possible way of obtaining a permanent record of a picture that has been taken consists in intermittently feeding a photosensitive paper across a printing tube which prints consecutive lines. In this process linearity errors in reproduction can be more easily avoided than when the photosensitive paper is simultaneously exposed overall. Moreover, line printing is particularly suitable for a fully automatic print-out on the photosensitive paper.

Once particular pictures have been finally selected for use it is by no means always necessary to produce a final record of these pictures on a photo-sensitive paper. An alternative would be to control the production of a corresponding printing plate directly by means of the permanently stored video signal, for instance by applying the signal to a litho-scanner. In such a case the possible tele-transmission of the video signal could be considered, for instance through a normal telephone line. This would be quite possible, notwithstanding the limited band width of telephone lines, since the transmission can take place at a suitable slow speed.

The necessary generation and processing of the synchronising signals for the purposes of the invention can proceed in exactly the same way as is the practice in television technology. The storage of the synchronising signals may be separately from or jointly with the video signals, according to the applicational case.

The invention is also intended to comprise within its scope the production of colour stills. However, the usual insertion of the colour information into the frequency spectrum of the black-and-white picture, as is usual in television, is not here necessary because there is sufficient time for the much simpler sequential transmission of complete colour separation signals. On the reproduction side the colour separation signals can be recombined in a colour display tube or they may be reproduced consecutively by a black and white display tube and used for printing out on a colour printing paper through colour filters appropriate to the particular colour separation signals. For relatively quick checks use can be made of instant printing papers. Naturally printing plates for the three colours can be directly produced, as described, under the direct control of the permanently stored video signals.

The invention also concerns apparatus for performing the above described method, such apparatus comprising a camera containing an electronic camera tube providing a resolution of at least 1000 lines per image, a permanent storage facility for the video signal from the camera, and reproducing means for converting the video signal read out of the permanent storage facility into a visual picture. Camera tubes which provide such a resolution are available on the market.

Preferably an intermediate storage unit into which the video signal is more rapidly written than it is read out is arranged to precede the permanent storage facility. This feature affords the advantages that have already been explained above in the description of the method. A suitable intermediate storage unit will be more particularly a signal storage tube associated with a deflection system operable at different selectable deflection frequencies. The size of the signal storage tube will be so chosen that it is capable of precisely storing one image. The signal storage tube has the advantage of being an analogue processing unit which is therefore capable, without special devices, of precisely recording all the greys and intermediate values of the video signal. Moreover, write-in and read-out are effected by the same electron beam so that only one deflection system is needed, although the time required for writing and the time taken for reading can be easily controlled by selecting the desired deflection frequency. Finally the tube has a lengthy storage time without requiring regeneration. Consequently the intermediately stored video signals can be read out at a very slow speed to achieve a very considerable reduction in band width.

The band width of the video signal on the camera side depends, as already noted, on the length of the exposure in the camera since the scan of the image produced in the camera should as such be over when the exposure ends. Consequently the band width will be the greater the shorter the exposure. For short exposures which as such will be often required, such as 1/100th second, the desired high resolution would result in a band width of the video signal on the output side of the camera too great to be processed otherwise than at the expense of considerable technical means. In order to overcome this difficulty the camera tube may be of a kind containing a photosensitive layer which has a short period storage effect contrary to the usual form of construction. The charge pattern in the camera tube representing the image will not then fade as quickly at the end of the exposure and can be more slowly scanned than corresponds to the length of the exposure. Typically the short period storage effect will be so chosen that the time available for scanning a complete image in the camera tube and accordingly for writing this into the intermediate storage tube is 40 msecs.

The permanent storage facility may be a core or a tape. A tape recorder is particularly suitable because the magnetic tape containing the stored video signals can be carried away and read elsewhere.

In order to avoid the video signal having to be repeatedly read out of the permanent storage facility for the purpose of reproduction, a process which would be particularly difficult to accomplish in the case of a tape recorder, the reproduction means are preferably preceded by an intermediate inverting storage unit associated with a repetition generator and the video signal of the picture that is to be reproduced is first written into this intermediate unit. The read-out from the inverting storage unit is repeated under the control of the repetition generator at a frequency which ensures the absence of flicker. In order to reduce the volume of apparatus the existing intermediate storage unit can also be operated as an inverting storage unit.

The reproduction means may conveniently consist of a monitor containing an electronic display tube. The monitor may be of conventional design and controlled by the video signal read out from the permanent storage facility. For achieving a permanent record the monitor may be designed for direct printout on a photosensitive paper by the display tube.

For performing the described line-by-line print-out on a photosensitive paper a reproducing means is suitable which comprises a single line electronic printing tube associated with an intermittent feed for photosensitive paper and adapted to feed the paper in steps at a constant average speed across the printing line of the printing tube. The employment of a single line printing tube, i.e. a tube which prints out one line at a time, permits the linearity error in reproduction to be minimised. Moreover, such a printing tube requires only a horizontal deflection system since vertical deflection is replaced by the intermittent feed of the photosensitive paper by step lengths equalling the height of a line. Particularly suitable is a printing tube provided with a glass fibre optical system since this gives particularly little distortion.

For the selection of a particular part of a picture for print-out the reproducing system may be provided with a deflecting system of controllably adjustable deflection amplitude and position.

Quite generally it may be said to apply to all the deflection systems used in apparatus according to the invention that the requirements relating to linearity and constancy of linearity are particularly stringent. Moreover, on the reproducing side relative low deflection frequencies are needed which are difficult to achieve with conventional time-bases because of the capacitive coupling they use. In apparatus according to the invention the deflecting systems for the camera, the signal storage tube and the reproducing tubes are preferably equipped with timebases composed of d.c. coupled amplifiers. These permit a very high linearity, direct coupling of the deflecting coils, as is desirable for slow deflection speeds, a wattless adjustment of picture position by a biasing voltage applied to the second amplifier input, and a change in the deflection amplitude to be achieved without adverse effect on linearity. Moreover, different deflection frequencies can be easily obtained so that the signal storage tube requires only one deflection system. Incidentally the same timebases can be used for horizontal and vertical deflection. Moreover, wide band calculating amplifiers are particularly suitable for the video amplifiers of the proposed apparatus because they can be directly coupled and thus avoid all the problems which arise in the transmission of video signals of low frequency at slow deflection speeds.

Figure 2:
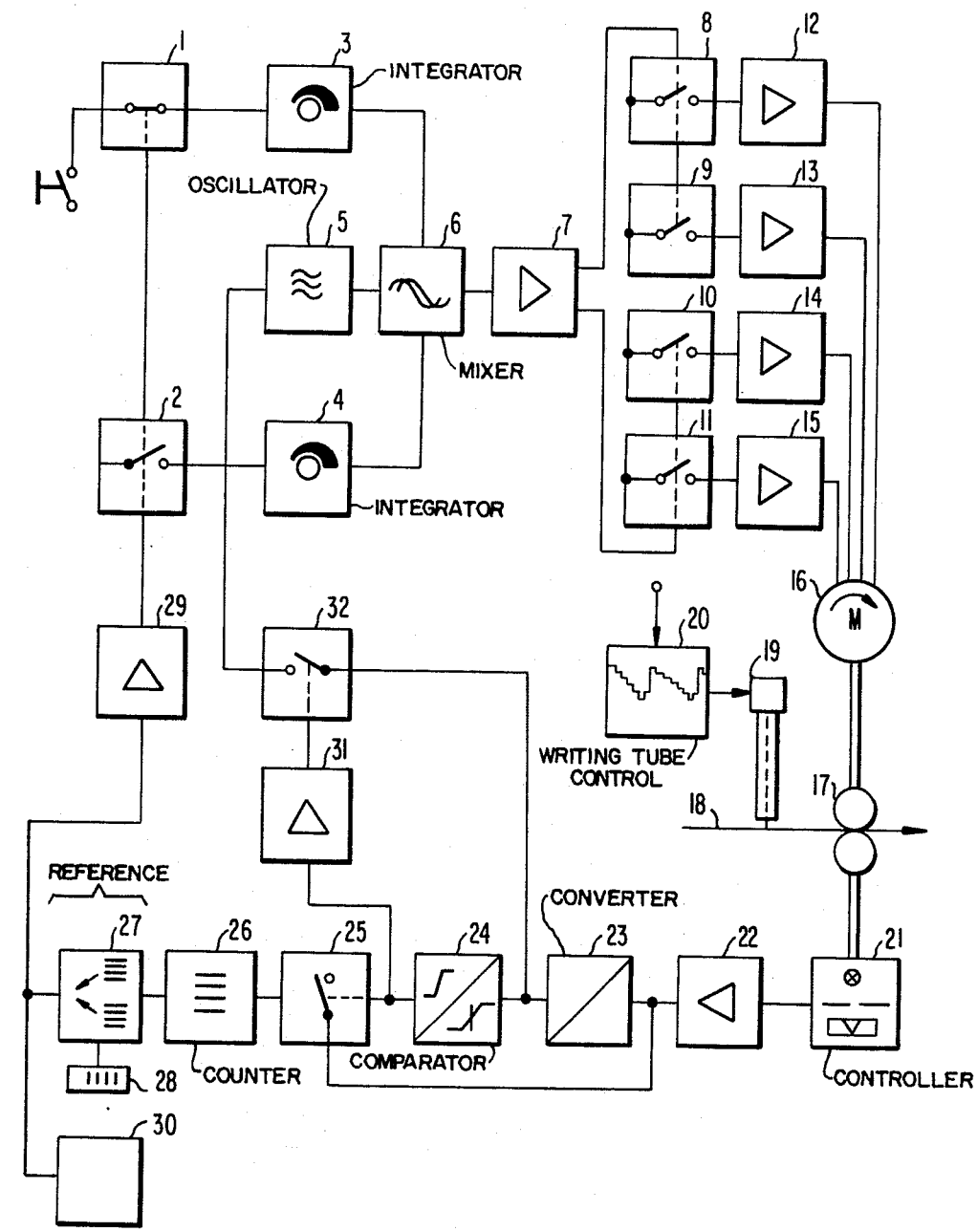

The invention and other advantageous particulars thereof will now be described in greater detail with reference to an embodiment shown in the accompanying drawings in which FIG. 1 is a greatly simplified diagram of apparatus according to the invention, and FIG. 2 is a block diagram of the circuitry of a reproduction system suitable for apparatus according to the invention.

Referring to FIG. 1 there is provided apparatus comprising a camera 50 which in so far as its objective, stop and shutter are concerned is constructed like a conventional camera for still photography excepting that the film guide is replaced by a conventional television camera tube complete with deflection system and associated video amplifier, an image of the photographed object being focused on the photosensitive layer of the tube. Moreover, in a manner not specially shown a synchronising pulse generator is provided to supply the synchronising pulses which are needed for horizontal and vertical deflection, and which are added to the video signal from the camera. The television camera tube provides a high resolution of 1500 lines per picture.

The image of the object produced by an exposure which may be as short as 1/100th of a second is scanned only once in 40 msecs. The photosensitive layer of the camera tube has a short period storage action which enables the charge pattern to be preserved for the duration of the scan after the end of an exposure. The band width of the video amplifier is determined by the resolution of the video amplifier and its scanning time.

The video output of the camera 50 is connected to a camera control monitor 51 which permits the camera adjustment to be checked when the shutter is open and whilst scanning proceeds. Furthermore, the video signal from the camera 50 is taken to an intermediate storage unit 52 comprising a video signal storage tube of conventional type with associated deflection auxiliaries. The resolution of the video signal storage tube is the same as that of the television camera tube and the storage tube is of appropriate size for the exact storage of one image picked up by the camera. The frequency of the deflection system is adjustable. For writing the video signal received from the camera the deflection frequency is set to a value corresponding to the scanning time of the camera so that the video signal representing one image can be stored in the signal storage tube as the scan proceeds in the camera.

When the video signal of one picture has been completely written the scanning frequency of the deflection system is changed to a lower frequency and the signal storage tube is changed over for read-out by an appropriate change of its target voltage. The video signal which is read out of the video signal storage tube and which compared with the corresponding video signal appearing in the camera output has a reduced band width because of the lower scanning speed during read-out is taken to a permanent storage facility in the form of a video tape recorder 53 and recorded on magnetic tape.

The read-out from the tape recorder is taken to an inverting video signal storage unit 54 which uses the same video signal storage tube as the intermediate storage unit 52. The video signal corresponding to a particular picture, according to the user's choice, is played back to the inverting video storage unit by the video tape recorder 53 when this particular picture is to be reproduced. The inverting video storage unit 54 serves a viewing monitor 55 to which the video signal from the inverting video storage unit is applied, and which reproduces the picture in conventional manner on the screen of its display tube. The deflection system of the viewing monitor is likewise controlled by the synchronising pulses which have been simultaneously recorded. Associated with the inverting video storage unit 54 is a repetition generator which permits the video signal to be repeatedly read out in order to maintain the picture on the screen of the display tube of the viewing monitor 55 for some length of time. The frequency of the repetition generator is sufficiently high to ensure absence of flicker.

Moreover, a printing monitor 57 is optionally connectable to the output of the inverting video storage unit 54 by a switch 56. The printing monitor 55 is of the same construction as the viewing monitor excepting that it possesses an electron tube lacking a fluorescent layer. The tube of the printing monitor exposes a photosensitive paper 58 which can be developed and which thus provides a permanent record of the picture that has been reproduced.

Instead of a printing monitor 57 a reproducing system such as that illustratively shown in FIG. 2 may be used which also enables a permanent record of the picture stored in the inverting video storage unit 54 to be produced on a photosensitive paper by means of a line-for-line print-out on the paper. The reproducing system according to FIG. 2 comprises a starter button for triggering a signal generator 1 which generates a starting pulse when triggered. This starting pulse starts a run-up regulator comprising an integrator 3. Oscillations provided by an oscillator 5 are converted in a mixer stage 6 to a beat frequency which steadily increases until it is exactly equal to the oscillator frequency. After amplification in an amplifier 7 this beat frequency is applied to four electronic switches 8, 9, 10 and 11 which convert it into stepping pulses which after amplification in amplifiers 12, 13, 14 and 15 control the working steps of a pulse or stepping motor 16. This motor drives the feed roller pair 17 of an intermittent feed for a band of photosensitive paper 18.

Associated with the photosensitive paper 18 is a one-line writing tube provided with a glass fibre optical system which writes in a direction across the direction of feed of the photosensitive paper 18. The writing tube 19 is controlled by circuitry 20 which comprises a video amplifier for the video signal from the inverting video storage unit 54 and a horizontal deflecting system for the writing tube 19. The writing tube affects a line-by-line print-out on the paper 18 which the pulse motor feeds at a constant average speed in intermittent steps equalling the width of a line.

The feed rollers 17 are associated with an increment controller 21 which through an amplifier 22 supplies a frequency corresponding to the speed of the paper feed.

A frequency/voltage converter 23 and a comparator 24 determine the exact instant synchronous speed of rotation is reached. From this instant onwards an electronic switch 32 controlled by a signal amplifier 31 applies the analogue voltage of the speed of rotation which appears in the output of the frequency-to-voltage converter 23 to the oscillator 5 to maintain correct positioning. At the same time the pulses from amplifier 22 are also applied through a pulse gate 25 controlled by the comparator 24 to a four digit decadic counter 26. The counter output is connected to a reference unit 27. When a predetermined length of paper has passed through to which the reference unit 27 can be preset by a preselector 28, the reference unit 27 activates a cutter 30 for cutting off the length of paper 18 besides triggering, via another amplifier 29, a second signal generator 2 which through an integrator 4 starts a run-down regulator 4 acting on stage 6. The printing process is thus completed.

What we claim as our invention and desire to secure by Letters Patent is:

1. A method for producing and processing photographic quality video signals comprising the steps of:
    converting an optical image into a video signal by high resolution electronic scanning at a scanning rate of at least about 1,000 lines per image wherein the exposure time for producing the video signal is less than about 10 milliseconds;
    writing said video signal into intermediate storage, the time for writing said video signal into intermediate storage being less than about 40 milliseconds; and,
    reading said video signal out of intermediate storage into permanent storage, the time for writing the video signal into intermediate storage being shorter than the time for reading the video signal out of intermediate storage into permanent storage.

2. A method of producing a photographic still by producing an optical image of the photographed object during a usual short exposure time, in which an electric charge pattern corresponding to the image is maintained beyond the end of the exposure and is converted by a single electronic high resolution scan at a scanning rate of at least 1,000 lines per image into a video signal which is intermediately stored, the time for completely scanning the charge pattern of one image and intermediately storing the corresponding video signal being less than about 40 milliseconds, in which the intermediately stored video signal is permanently stored, the time for writing the signal into intermediate storage being shorter than for writing into permanent storage, and in which the still is written by the permanently stored video signal.

3. A method as claimed in claim 2 in which the video signal that is to be written out is taken to an inverting video signal storage unit and read out from this unit several times per second.

4. A method as claimed in claim 2 in which the exposure time is less than about 10 milliseconds.

5. A method as claimed in claim 2 in which the picture is written by a picture display tube.

6. A method as claimed in claim 5 in which the picture display tube is used to print out on a photosensitive paper.

7. A method as claimed in claim 6 in which the photosensitive paper is fed in intermittent steps past a printing tube for a line-by-line print-out.

8. Apparatus for producing a photographic still, comprising:
    means for producing an optical image of the photographed object during a usual, short exposure time for a photographic still, in which an electronic charge pattern corresponding to the image is maintained beyond the end of the exposure;
    means for converting the charge pattern into a video signal by high resolution, electronic scanning at a scanning rate of at least 1,000 lines per image;
    intermediate storage means for storing the video signal, the time for scanning the one image and intermediately storing the corresponding video signal being less than about 40 milliseconds;
    permanent storage means for permanently storing the video signal, the time for writing the signal into intermediate storage being shorter than for writing the signal into permanent storage; and,
    means, employing the permanently stored video signal, for writing the still.

9. Apparatus as climed in claim 8 in which the intermediate storage unit comprises a video signal storage tube and an associated deflection system of selectable deflection frequency.

10. Apparatus as claimed in claim 8 in which the permanent storage means comprises a magnetic core or a magnetic tape.

11. Apparatus as claimed in claim 8 including means for repetitively generating the video signal read from the intermediate storage means.

12. Apparatus as claimed in claim 8 in which the still writing means has a display tube adapted to print on photosensitive paper.

13. Apparatus as claimed in claim 8 in which the still writing system comprises a deflection system of adjustable amplitude and position.

14. The apparatus of claim 8 including an inverting video signal storage unit and associated repetition generator for inverting and repetitively generating the video signal read from the intermediate storage means.

15. Apparatus as claimed in claim 8 in which the still writing means comprises a one-line electronic printing tube and an associated intermittent feed for feeding a photosensitive paper in steps at constant average speed past the printing tube perpendicularly to the direction in which the tube prints.

16. Apparatus as claimed in claim 15 in which the printing tube is provided with a glass fibre optical system.

* * * * *